United States Patent [19]

Ogino

[11] Patent Number: 5,109,380
[45] Date of Patent: Apr. 28, 1992

[54] TESTING APPARATUS

[75] Inventor: Toru Ogino, Kanagawa, Japan

[73] Assignee: Mitsubishi Denki Kabushiki Kaisha, Japan

[21] Appl. No.: 329,751

[22] Filed: Mar. 28, 1989

[30] Foreign Application Priority Data

Mar. 30, 1988 [JP] Japan .................................. 63-77007

[51] Int. Cl.$^5$ ........................ G01R 31/28; G06F 11/00
[52] U.S. Cl. .................................................. 371/15.1
[58] Field of Search ................. 371/15.1, 23; 364/550, 364/551.01, 141, 148

[56] References Cited

U.S. PATENT DOCUMENTS

| | | | |
|---|---|---|---|
| 4,628,435 | 12/1986 | Tashiro et al. | 364/300 |
| 4,649,515 | 3/1987 | Thompson et al. | 364/900 |
| 4,670,848 | 6/1987 | Schramm | 364/200 |
| 4,736,296 | 4/1988 | Katayama et al. | 364/200 |
| 4,754,410 | 6/1988 | Leech et al. | 364/513 |

FOREIGN PATENT DOCUMENTS 0204118 8/1988 Japan .
0228080 9/1988 Japan .

OTHER PUBLICATIONS

"Testing device", Toru Ogino, Mar. 27, 1987, Abstract.
"Artificial intelligence in semiconductor manufacturing for process development, functional diagnostics, and yield crash prevention", 1986, M. C. Murphy Hoye, IEEE New York, pp. 939–946.
"A knowledge-based system for designing testable VLSI chips", 1985, pp. 56–68, IEEE, New York, U.S., M. S. Abadir et al.
"A knowledge based diagnostic system for automatic test equipment", pp. 930–938, IEEE, New York, U.S., 1986, B. L. Havlicsek.
"Enhancing Knowledge Representation in Engineering Databases", Hartzband et al., 1985, 39–48.
"Applications of AI in Engineering", Faught, 1986, 17–26.
"Fault Diagnosis", Laffey, 1986, 8–11.

Primary Examiner—Robert W. Beausoliel
Assistant Examiner—Phung My Chung
Attorney, Agent, or Firm—Wolf, Greenfield & Sacks

[57] ABSTRACT

A test apparatus for data processing and/or editing test data obtained from an object unit to be tested includes, in combination, an organization trade-off element; a failure mode and effect analysis list preparation element, a design review element consisting of a learning section, a knowledge base section and an inference section; a diagnosis rule preparation element; and a data diagnosis element consisting of a knowledge data base section and an inference function section.

14 Claims, 12 Drawing Sheets

Fig. 6

| 51 | 52 | 53 | | 54 | 55 | 56 | 57 | 58 | 59 | 60 |
|---|---|---|---|---|---|---|---|---|---|---|
| Item Code | Parts/ Com't Name | Function | | Failure Mode | Cause of Failure Mode | Effect of Failure Mode | Deg. of Influence | Prob. of Occurrence | Deg. of Significance | Countermeasure Advice |
| | | | S/N | | | | | A B C | | |

Fig. 8

| Item Code 51 | Parts/Com't Name 52 | Function 53 | S/N 54 | Failure Mode | Cause of Failure Mode 55 | Effect of Failure Mode 56 | Deg. of Influence 57 A | Prob. of Occurrence 58 B | Deg. of Significance 59 C | Countermeasure Advice 60 |
|---|---|---|---|---|---|---|---|---|---|---|
| TH1 ∼ TH2 | Radial Thruster | Generate a thrust reg'd for changing the orbit | R1 | Unable to produce thrust | • Catalyst deteriorated • Clogging of inlet tube • Deformed poppet | No (redundant construction) | 1 | 4 | 4 | No |
| | | | R2 | Thrust performance reduced | - do. - • Wrong heat design | - do. - | 1 | 4 | 4 | No |
| | | | R3 | Leak out (liquid or gas) | • Improper seal • Dust | Unable to control attitude & orbit | 4 | 2 | 8 | • Duplex seal structure • Leak test before/after environ't test |
| TH3 ∼ TH4 | Axial Thruster | Generate a thrust reg'd changing attitude & angle of orbit inclination | A1 | Unable to produce thrust | • Catalyst deteriorated • Clogging of inlet tube • Deformed poppet | No (redundant construction) | 1 | 4 | 4 | No |
| | | | A2 | Thrust performance reduced | - do. - • Wrong heat design | - do. - | 1 | 4 | 4 | No |
| | | | A3 | Leak out | • Improper seal • Dust | Unable to control attitude & orbit | 4 | 1 | 4 | • Duplex seal structure • Leak test before/after environ't test |
| FL1 | Filter | Prevent entrance of foreign matter to downstream (thruster) | F1 | Loss of pressure | • Dust, Clogging | Short service life | 3 | 1 | 3 | No |
| | | | F2 | Breakage of element | • Excessive pressure shock load | No (propellant valve filter inserted) | 1 | 1 | 1 | No |
| | | | F3 | Leak out | • Improper seal | Unable to control attitude & orbit | 4 | 1 | 4 | • Leak test before/after environ't test |

101 — Rule 1
106 — (Assump'n part): ① If attitude detection sensor No. 1's output ≤ 25, or
② if attitude detection sensor No. 1's output ≥ 35,
107 — (Concl'n part): then, attitude detection sensor No. 1 is out of order.

102 — Rule 2
(Assump'n part): ① If gyroscope No. 1's output ≤ 50, or
② if gyroscope No. 1's output ≥ 60,
(Concl'n part): then, gyroscope No. 1 is out of order.

103 — Rule 3
(Assump'n part): ① If wheel No. 1's otuput ≤ 200, or
② if wheel No. 1's output ≥ 250,
(Concl'n part): then, wheel No. 1 is out of order.

104 — Rule 4
(Assump'n part): ① If attitude detection sensor No. 1 is normal, and
② if gyroscope No. 1 is normal, and
③ if wheel No. 1 is normal,
(Concl'n part): then, diagnosis by attitude/orbit control subsystem 1 is normal.

105 — Rule 5
(Assump'n part): ① If attitude detection sensor No. 1 is normal, and
② if gyroscope No. 1 is normal, and
③ if wheel No. 1 is out of order,
(Concl'n part): then, cause of improper attitude/orbit subsystem is: possible from improper wheel 1.
Countermeasure: check the wheel driver circuit and input signal level.

TESTING APPARATUS

BACKGROUND OF THE INVENTION

The present invention relates to an electronic testing apparatus which can, for instance, be adapted to test the function and performance of an artificial satellite station for affirmation on the ground.

It is generally known that a conventional testing apparatus for an artificial satellite station as described, for example, in the article entitled "ETS-1; ISS Checkout Apparatus" to be found in Mitsubishi Denki Gihoo (Mitsubishi Electric Technical Periodical) Vol. 47, No. 3, 1973, comprises, as generally shown in FIG. 12, subsystem test units for testing subsystem by subsystem a satellite station to be tested, and a data processing unit for the processing of data from these subsystem test units. This drawing diagrammatically shows an artificial satellite station designated by reference numeral 1 which is tested from the ground in connection with the function and performance thereof, a series of subsystem testing units 2 for testing in terms of each of the subsystems that comprise the satellite station such items as, for example, the power source for supplying each subsystem with electric power, the control subsystems for controlling the attitude and/or the orbit of the satellite, etc., and a data processing unit 3.

More specifically, each of the subsystem testing units 2 is adapted to perform a test on the ground to check whether the subsystems of the satellite station for the power supply system, the telemetry/command system, the attitude and orbit control system, the propulsion system, the heat control system and the like are operating properly as designed.

In the function test conducted on, for example, a test subsystem for the attitude and orbit control system, a test is undertaken to ensure that its designed ability for attitude control is operating properly through tests on such elements as attitude detection sensors, attitude control electric circuits, attitude control drive mechanisms, etc. Similarly, during the performance test, a test is conducted to check whether the accuracy of attitude control and of control velocity comes within the range of the design parameters.

All data output from the tests on each subsystem as noted above will then be supplied to the data processing unit 3. This data processing unit 3 incorporates testing data processing means based on suitable software which is specifically adapted to undertake data processing and/or editing of the test data output. The output data obtained from the test conducted on, for instance, the attitude and orbit control subsystem, such as analog data including voltage values indicating the data output by the attitude detection sensor and electric current and voltage values observed at many points of the electric circuits, etc., are input together with binary digital data indicating the current ON/OFF status of each switch, binary digital data on the revolution numbers indicating the current control velocity and the like to the above-mentioned data processing unit 3, where the data are subjected to processing and/or editing as noted above. In general, the data processing unit 3 may be a general purpose large-sized computer or minicomputer, and all the data output from this unit may be processed and/or edited by way of binary digital representation.

More specifically, the nature of this data processing unit 3 provided for data processing and/or editing is principally that binary data is converted into decimal digits by virtue of the engineering system of the units, various data collected at certain points in time are classified to be shown in tables, and the behavior of data on variable values is edited to be represented in graphs. Once such data has been processed and/or edited in this manner it may then be output by way of a line printer or a cathode ray tube (CRT) in a visual form.

With such data made available in this manner, specialists in the artificial satellite field may readily perform a diagnostic review of the thus-prepared data obtained from the tests. This diagnostic review of the test data allows a decision to be made as to whether or not the function and performance of each of the functional subsystems incorporated in an artificial satellite station is in a good condition in accordance with the overall design, and the data employed in the system design may be adapted to be employed as the criteria for this determination. In addition, when the test data fails to satisfy the requirements of the system design, a prediction regarding which part of a subsystem is out of order can be made by taking account of precedents and/or technical knowledge related thereto.

Conventional test apparatus used for artificial satellite stations are generally constructed in the manner noted above, and the diagnostic review of the test data obtained on each subsystem of a satellite is in practice done by humans. Thus, it is left to specialists in the artificial satellite field to determine whether or not test data are satisfactory and to predict which part is out of order when appropriate.

It is common practice for engineers or designers of an artificial satellite station to make a trade-off or compromise in regard to the allocation of functions or performance at the design and engineering stages as between the functions and performance essential for a subsystem incorporated in the overall system and a construction that is sufficiently practical to be employed in actuality. For this purpose, functional block diagrams may be prepared. In the conventional design of test apparatus for satellite stations, while it has been common for a trade-off of this type to be made when considering the various design data that could be used in the original design, means of preparing the necessary functional block diagrams have not been incorporated in the design system by way of readily available software. In this connection, all the steps of reviewing the design and engineering stages which involve reexamining the results of implementing a certain design and identifying unsuitable features that need to be corrected have been left to the personnel concerned, and there has been no means available in the conventional test apparatus allowing such design reviews to be undertaken by way of software for the purpose of dispensing with the need for human effort in this work. More specifically, since no means has been adopted capable of making use of such software as the so-called "Failure Mode and Effect Analysis" which is adopted at the time of system design, these steps have to be taken by humans, which naturally means that efficient utilization of the design data cannot be ensured.

As discussed above, the design of conventional artificial satellite test apparatus having the construction noted above involves the diagnostic review of an enormous amount of test data by humans which has required that many specialists in the artificial satellite field have been employed in such diagnostic work. Consequently, a significant problem has been that, owing to the man hours involved in the diagnostic review of such a vast amount of test data, it takes a substantial time for the specialists to complete these tasks in comparison with the completion of the original design drawings and design and engineering data. In order to determine if the test data are satisfactory, to predict the location of any possible defective parts in the system, and to complete similar work, many specialists have been required to expend many man hours. Moreover, since such design and testing work have not been operatively coordinated as the various tasks are done by different departments of an organization, there has been a significant problem in that the design results have not been made fully available for testing operations.

The present invention is essentially directed to the provision of a useful solution to the inevitable problems noted above. This is achieved by having a data diagnosis unit connected operatively to a data processing unit in an attempt to reduce and automate the design and design review jobs, and by making good use of the design data accumulated at the design stage in the testing operations that follow, and by automating the diagnosis of test data obtained, thus contributing to a reduction in the number of steps to be undertaken in the test operations and to a shortening of the period required for testing.

SUMMARY OF THE INVENTION

According to one aspect of the present invention, there is provided an improved test apparatus for testing the function and performance of an artificial satellite station for affirmation on the ground, which comprises a data diagnosis unit adapted to work in combination with a conventional means data processing, with four means incorporated as software means for making use of a plurality of design data obtained at the time of the original system design, that is, a system organization trade-off means, a failure mode and effect analysis list preparation means, a design review means and a diagnosis rule preparation means.

In addition, a software means is incorporated in the data diagnosis unit for the purpose of diagnosing test data. This "diagnosis type expert system", which is a common name in the fields of knowledge engineering and artificial intelligence systems, is called herein a diagnostic means, and comprises a knowledge data base section and an inference function section. Incorporated in the knowledge data base section is a reference for decision-making in connection with the diagnosis of test data which is included as a rule in the data base, and which takes the design values of the original design as its reference value. The inference function section is an algorithm for the inference of a result according to so-called syllogism or the like, which is incorporated in the system as a software means, and which is adopted in the inference of a result of diagnosis from an aggregate of "if . . . , then . . . " rules.

The data diagnosis unit as noted above may be a so-called "inference machine" capable of processing at high speed a software program which is written by an "artificial intelligence language" as such Lisp or Prolog. Known inference machine include, for example, some serial processing type inference machines which are already on the market and have been put into practice in Japan.

According to the present invention, a system organization trade-off means is incorporated in the data diagnosis unit, which enables a trade-off procedure to be conducted in practice in connection with a system or subsystem construction in accordance with the required specification. This allows functional block diagrams to be readily obtained in correspondence with a given design drawing figure.

Then, according to the thus-obtained functional block diagram, it is even feasible to preliminarily analyze and take countermeasures against any possible failure mode of an artificial satellite at the system design stage by using the failure mode and effect analysis list preparation means. Also, by utilizing the design review means, it is possible to re-evaluate the results of a system design, find any defects in the design and accordingly correct such defects.

Additionally, according to the thus obtained results of analysis, it is practical to prepare a suitable diagnosis rule (from which the criteria for decision-making to be used in the diagnosis of test output data may as a rule be made), whereby the results of analysis obtained at the original system design stage may be put to efficient use in diagnosis during a test operation. Furthermore, with the employment of a useful diagnosis means which comprises a knowledge data base section with the rule for diagnosis of the test output data and an inference function section, it is feasible in practice to automate the diagnosis of test output data, and with a specialized data diagnosis unit being connected operatively, it is also possible to realize the high-speed diagnosis of data obtained from a test and the shortening of the period required for testing.

According to the present invention which comprises a useful system adapted to operatively connect a data diagnosis unit to a conventional data processing unit, thus effecting direct coupling of the design and testing work so that they can coordinated with each other, the design data used at the original system design stage may be utilized efficiently during a test operation, and the work of diagnosing test data may be conducted by a machine. Consequently, there is a substantial reduction in the amount of work and, due to the automation of the design and design review work, such work can be done at a relatively high speed.

Other aspects and advantages of the present invention will become apparent from a reading of the following detailed description when considered in conjunction with the accompanying drawings, in which like parts are designated by like reference numerals.

BRIEF DESCRIPTION OF THE DRAWINGS

In the drawings:

FIG. 6 is an illustrative chart showing an example format for the FMEA list to be prepared by the failure mode and effect analysis list preparation means shown in FIG. 2;

FIG. 8 is a table explaining the relationship between the diagnosis rule prepared by the diagnosis rule preparation means shown in FIG. 2 and the FMEA list referred to in FIGS. 6 and 7;

FIG. 10 is a schematic table explaining the knowledge data base shown in FIG. 2;

DETAILED DESCRIPTION OF THE INVENTION

Figure 1:
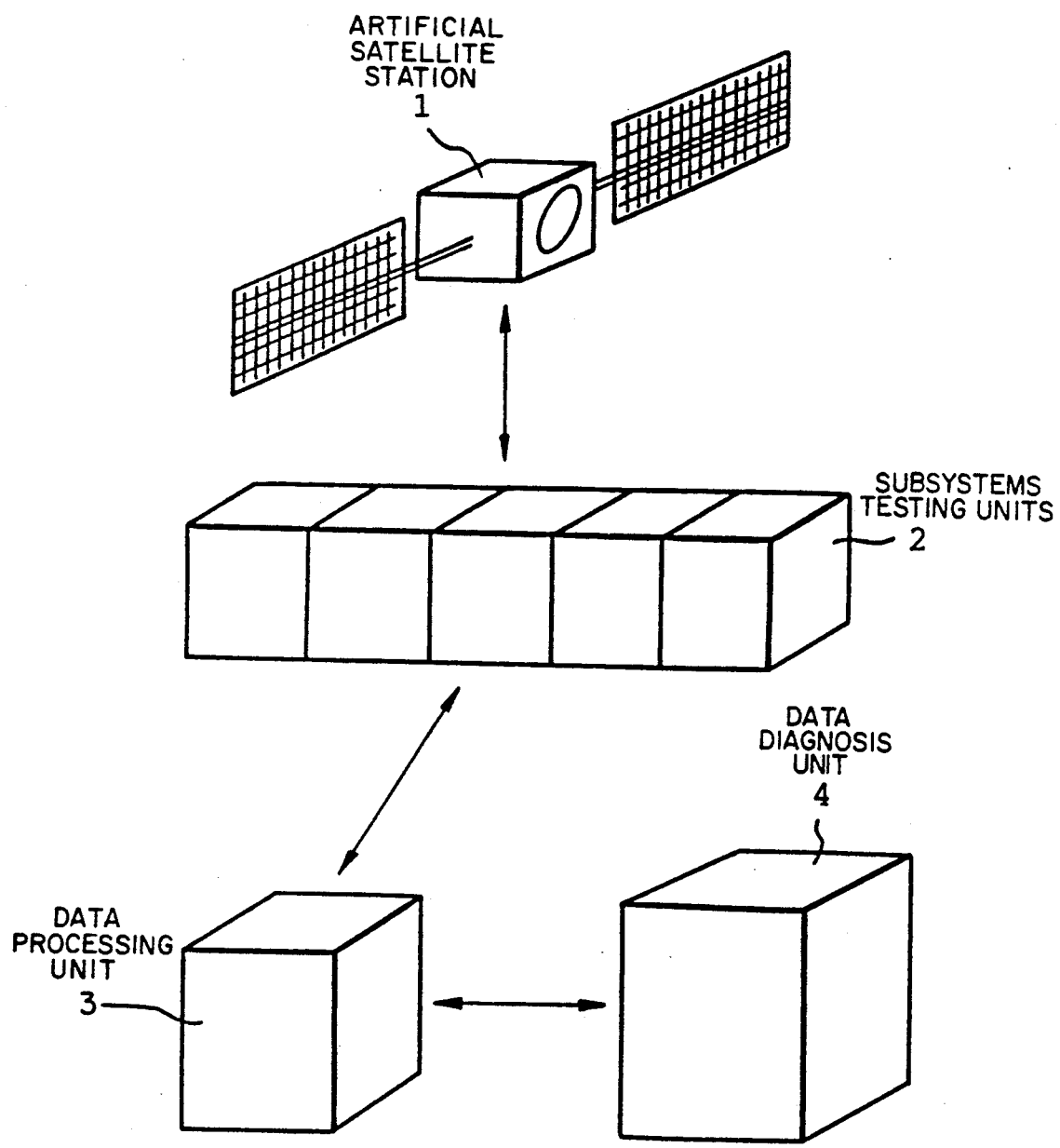
FIG. 1 is a schematic view showing the general construction of the present invention by way of a preferred embodiment thereof.
Figure 2:
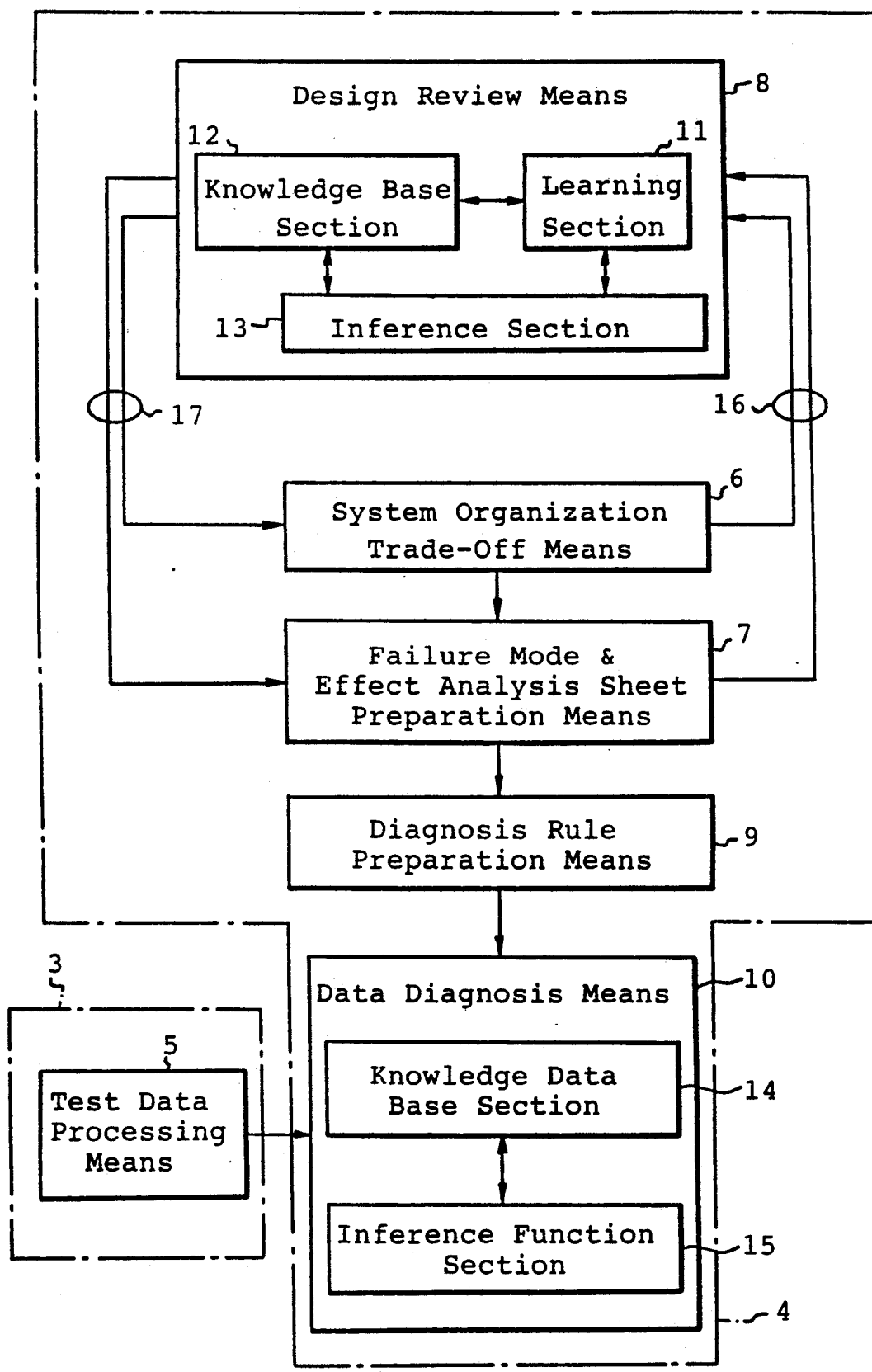
FIG. 2 is a diagrammatic view showing software to be incorporated as a means of flow processing which is shown by way of a preferred embodiment of the invention.

FIG. 1 shows the general construction of the hardware of a preferred embodiment of the present invention, in which reference numerals 1 to 3 designate the same components as those explained in regard to the conventional construction, that is, an artificial satellite station 1, subsystem testing units 2 and a data processing unit 3. Provided in addition to them is a data diagnosis unit designated by 4, which is operatively connected to the data processing unit 3. Incorporated in the data processing unit 3 and the data diagnosis unit 4 is software in the form of an operative means for the execution of each processing according to its algorithm. Shown in FIG. 2 is a software construction which is built into the data processing unit 3 and the data diagnosis unit 4. This drawing shows a test data processing means 5 built into the data processing unit 3, this means being the same as the conventional means.

Next, a component trade-off means 6, a failure mode and effect analysis list preparation means 7, a design review means 8, a diagnosis rule preparation means 9 and a diagnosis means 10 are shown as software built into the data diagnosis unit 4. The design review means 8 comprises a learning section 11, a knowledge base section 12 and an inference section 13, and the diagnosis means 10 comprises a knowledge data base section 14 and an inference function section 15.

In an artificial satellite station system constructed in the manner reviewed above, test data from the satellite are input into the data processing unit 3 via subsystem testing units 2, where they may be processed and/or edited by the test data processing unit 5 as the case may be. The manner of processing conducted in this section is identical with that performed in the conventional unit.

The thus-processed and/or edited test data supplied by the test data processing unit 5 are fed into the data diagnosis unit 4, where they are subjected to diagnosis by the diagnosis means 10.

According to the present invention, there is provided a specific contrivance for making efficient use of the design data accumulated at the time of original system design in connection with the test data diagnosis conducted by the diagnosis means 10. More specifically, certain software means are arranged in such a manner that, before conducting a test data diagnosis as noted above, that is, when the original system design is conducted, the system organization trade-off means 6, the failure mode and effect analysis list preparation means 7, the design review means 8 and the diagnosis rule preparation means 9 are operated in sequence so as to allow utilization of the thus-obtained original design data in the diagnosis of test data.

A more detailed explanation of the software means will now be given.

Figure 3:
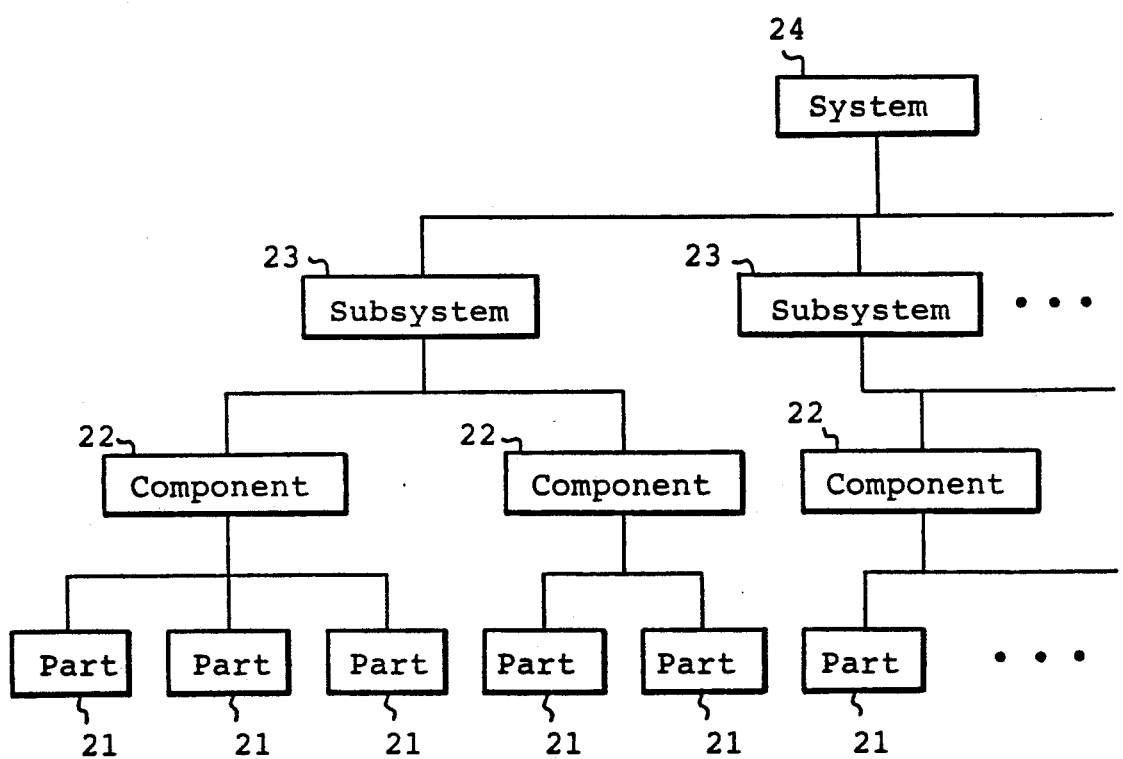
FIG. 3 is a schematic view showing typical structural units for an artificial satellite station.

It is known in general that an artificial satellite station comprises a plurality of minimal component units called parts 21, as typically shown in FIG. 3. These component units when grouped in a certain function unit are called a component 22, which are themselves grouped into units for various useful functions, each unit being called a subsystem 23, all of which together comprise one system to constitute the artificial satellite station 24.

For convenience in the explanation of the generation construction of an artificial satellite station, the following three organizational elements of a satellite station will be classified as follows:

(1) a system or a subsystem (system/subsystem);
(2) a component; and
(3) a part.

When applying this classification more practically to the name of the constructional elements of an artificial satellite, "system" may well correspond to the entire artificial satellite, and "subsystem" may correspond to a power supply subsystem, a telemetry/command subsystem, an attitude and/or orbit control subsystem, a propulsion (gas jet) subsystem, or a heat control subsystem, etc. Further, "component" may likewise correspond to an attitude detecting sensor, an electronic control circuit, etc. taking, for example, the attitude and/or orbit control subsystem, and "part" may well correspond to a resistor, a capacitor, an integrated circuit or the like.

When performing design work for the systems/subsystems of a satellite, it is generally necessary to make a certain compromise or trade-off between the essential specification related to function and performance and the practical construction in terms of the design and engineering of such systems/subsystems so as to allow decisions to be made in accordance with cer'ain evaluations and specification requirements in practice. Because of this need for compromise in connection with the design and engineering involved, it is common practice to select as evaluation parameters weight, electric power consumption, reliability and cost. Then, the construction of a system/subsystem which comprises a plurality of components may be made to satisfy the essential specification and may be materialized in production terms on the basis of comparative studies undertaken on such evaluation parameters.

The construction of components which comprise a plurality of parts may also be determined through similar trade-off procedures.

Figure 4:
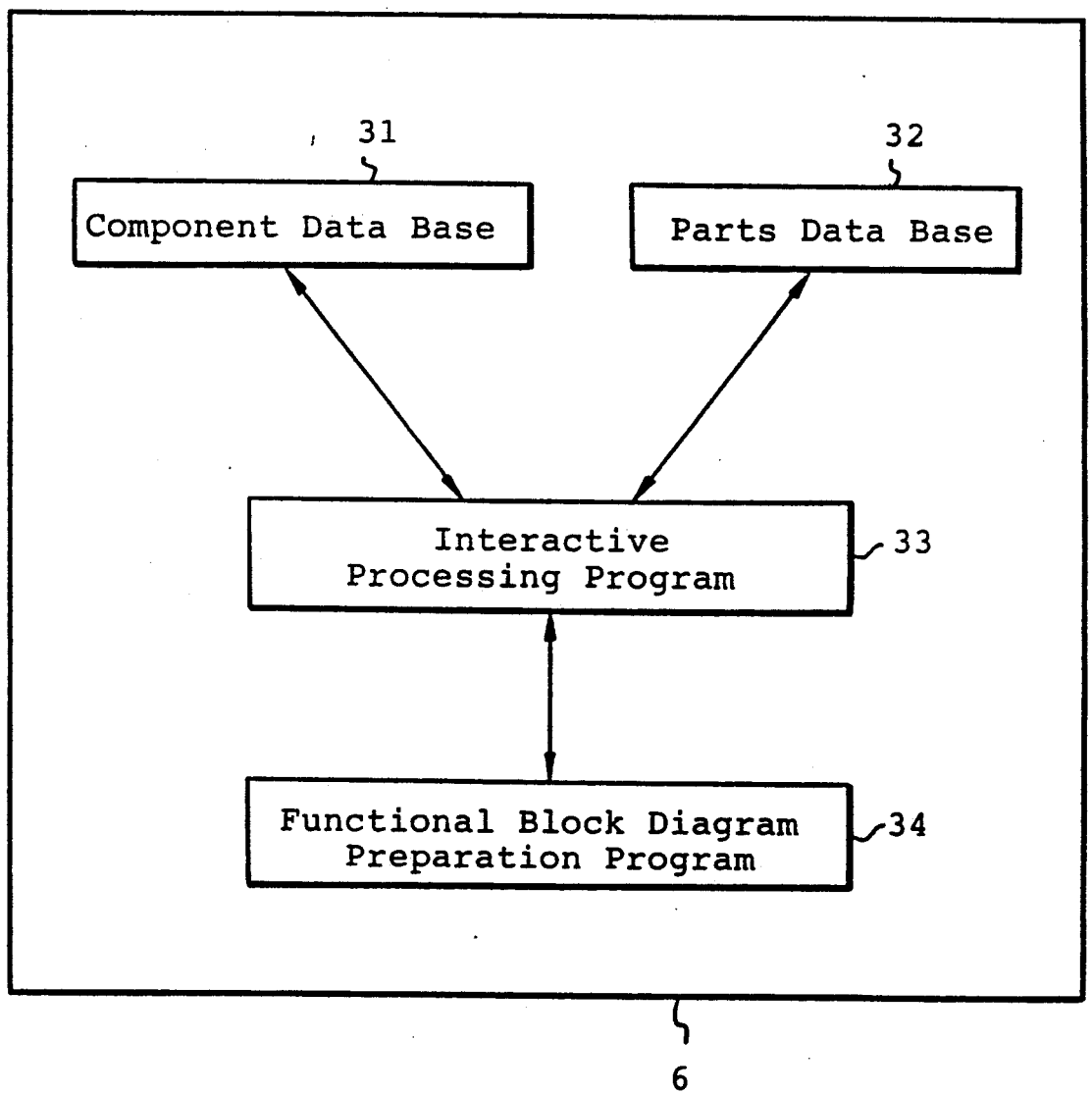
FIG. 4 is a schematic view showing generally the program construction of a system organization trade-off means to be used in system organization.

The system organization trade-off means 6 consists of software which is able to follow the above-mentioned course of compromise reached by way of interactions between it and a designer or engineer, and as shown schematically in FIG. 4, this means comprises a component data base 31, a part data base 32, an interactive processing program 33 and a functional block diagram preparation program 34.

In the component data base 31 and the part data base 32, data on the components and parts of artificial satellites designed in the past and having certain positive achievements in terms of successful flight are accumulated.

As a consequence, when a certain specification of a function or performance factor that is required of the system/subsystems of a satellite is given by a designer, the interactive processing program 33 serves to select from the component data base component data which may accord with the required specification or data similar thereto, thus allowing them to be displayed together on the screen of a CRT. These component data include such values as ones for weight, electric power consumption, reliability and cost which are made available as evaluation parameters. Thus, the designer may inspect the values of these evaluation parameters and change the combinations of such components in a system/subsystem as desired, eventually determining the preferred construction of the relevant system/subsystems accordingly. Also, the designer may likewise determine the construction of components comprising a plurality of parts on the basis of the part data base.

Following determination of the construction, a functional block diagram which may serve as a design drawing is prepared by the functional block diagram preparation program 34, which is then made ready for display on the screen of a CRT.

Figure 5:
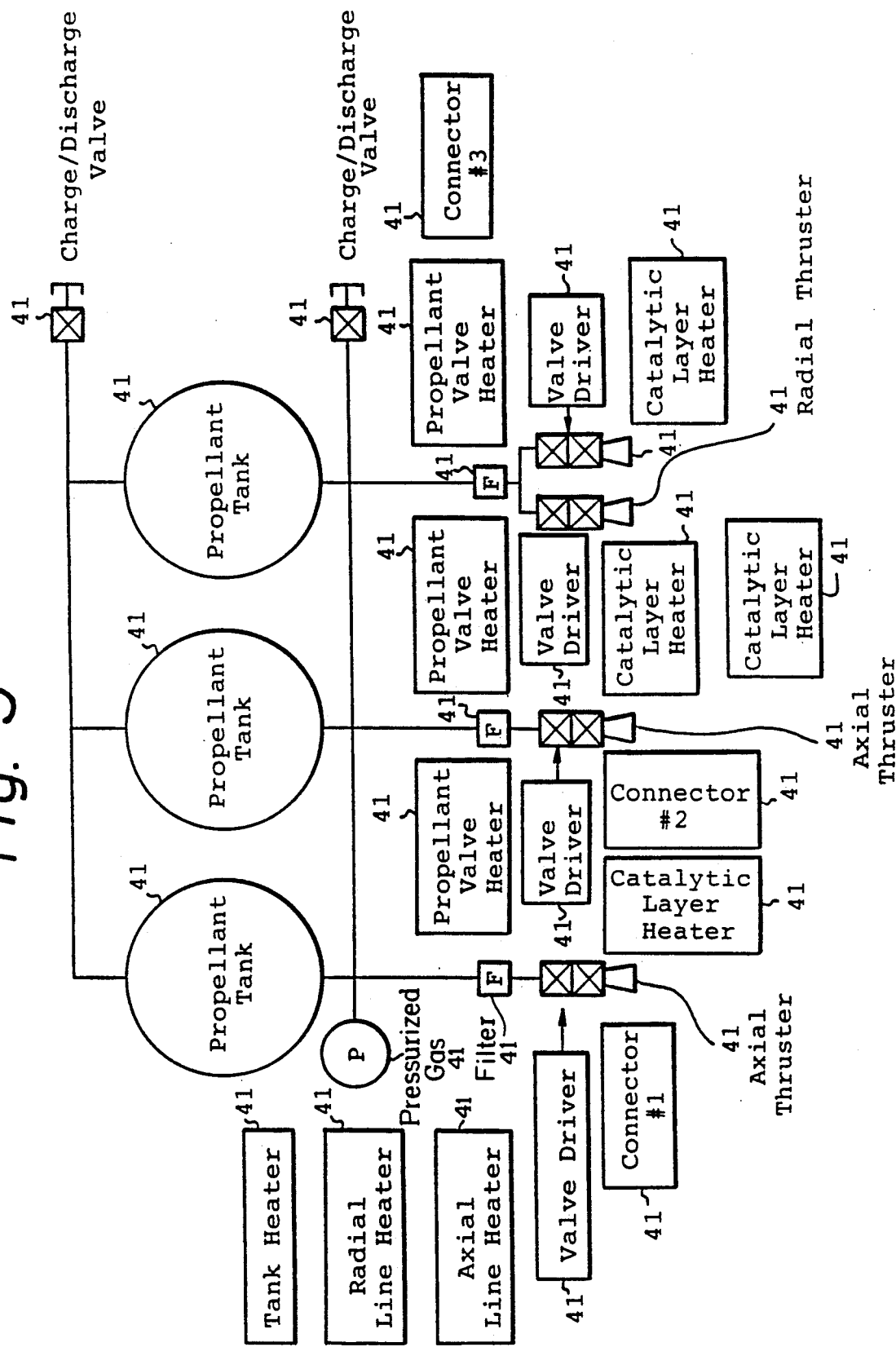
FIG. 5 is a schematic view showing an example of functional block diagrams to be prepared by a system organization trade-off means in system organization.

This functional block diagram preparation program 34 is designed with a function similar to that of a program which affords the preparation of general block diagrams. By way of example a functional block diagram of a propulsion (gas jet) subsystem is shown in FIG. 5. As typically shown in FIG. 5, each of the functional blocks 41 corresponds to one of the components 22 as selected through the trade-off procedures noted above in the original design, and following such trade-off procedures a functional block diagram of the type shown in FIG. 5 is drawn by the functional block diagram preparation program 34.

The failure mode and effect analysis list preparation means 7 is a software means or program which serves to perform a failure mode and effect analysis (abbreviated as FMEA) in accordance with the thus-prepared functional block diagram and to bring the results of its analysis into an FMEA list accordingly.

This FMEA is a useful procedure for analysis which is commonly practiced at the original system design stage as one of the various system engineering-like analytic techniques available. In this invention, the steps of processing conducted by the failure mode and effect analysis list preparation means 7 is duly constructed in accordance with this analytic technique or FMEA, by means of which an FMEA list can be prepared through the interaction between the data diagnosis unit 4 in which this means 7 is incorporated and a designer or specialist in the artificial satellite field. This interaction is termed "interactive processing" herein which is meant to indicate a method whereby a specialist may key-in an answer to an interrogative sentence displayed on the screen of the CRT by way of, for example, a graphic display or the like of the data diagnosis unit.

This failure mode and effect analysis list preparation means 7 is comprised of an FMEA format preparation program and an interrogative sentence generation processing program, which will now be explained in detail.

(a) FMEA Format Preparation Program

This is a program which serves to prepare the format (framing) of the FMEA list according to the FMEA procedure noted above, and which has a similar function to that of the flow of processing for a program which serves to prepare a general table framing. FIG. 6 shows an example of formatting of an FMEA list as prepared by such a program. In this drawing, the names of columns 51 to 60 are shown according to the details to be placed therein, which follows the style of division generally employed in the FMEA procedure noted above.

(b) Query Generation Processing Program

Figure 7:
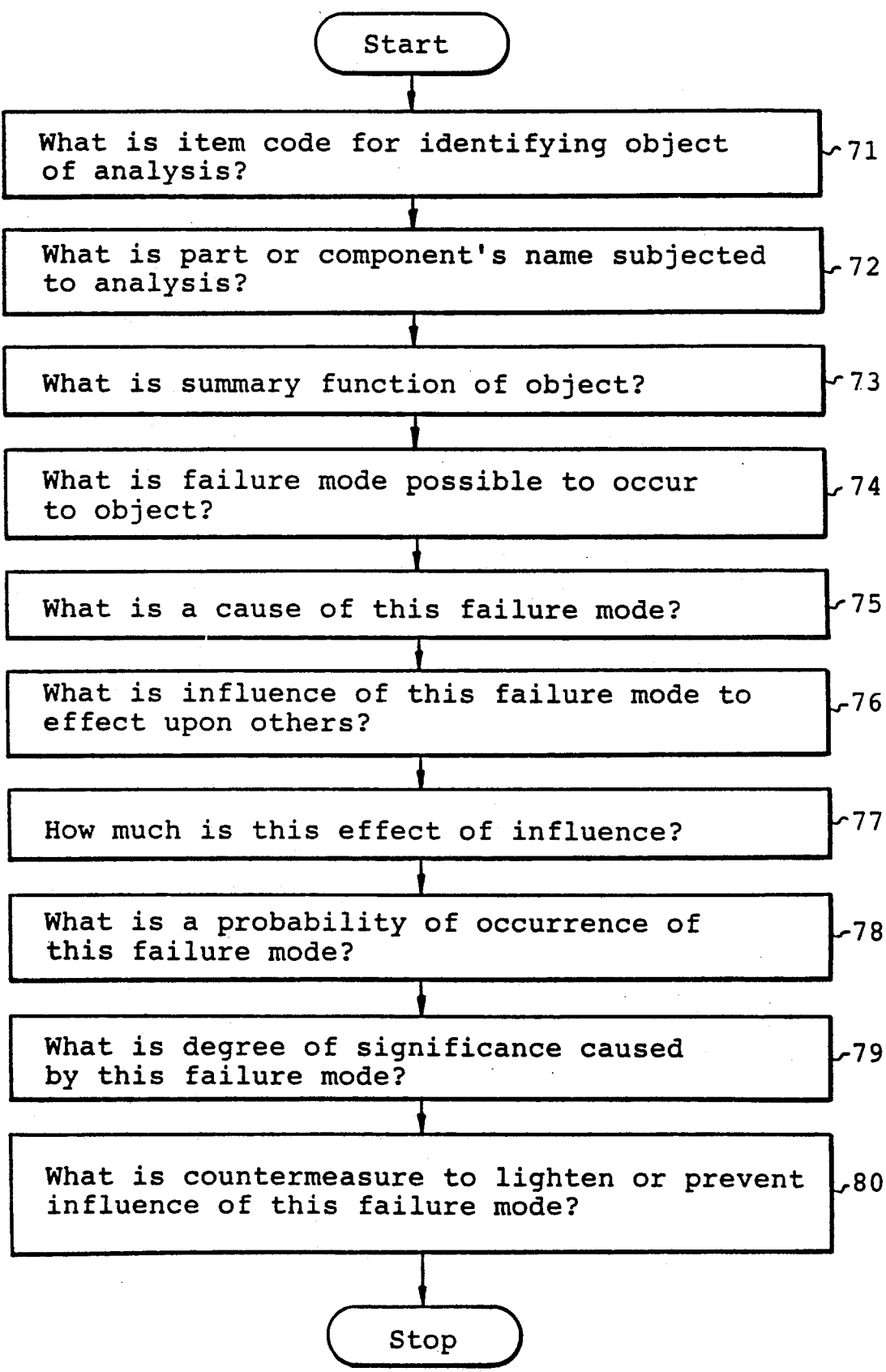
FIG. 7 is a flow chart showing the operation of the failure mode and effect analysis list preparation means referred to in FIG. 6.

This is a program which serves to perform such processings as generating an interrogative sentence for aiding a specialist to fill blank columns of the FMEA list prepared by the FMEA format preparation program with required details, having such sentences displayed on the CRT screen, fetching the answers given by a specialist to such interrogative sentences, and then filling each column in the FMEA list on the screen, such processing operations being similar to those undertaken in a general interactive processing program. For a further detailed explanation of the processing of this type of program, the flow chart in FIG. 7 shows examples of interrogative sentences generated in sequence during the processing conducted by such a program. When a specialist inputs his answer in response to each of the interrogative sentences 71 through 80 as shown in this drawing using the key-board of the data diagnosis unit 4, this program serves to fill the columns of the FMEA list with the input answers to complete the FMEA sheet.

Further, it is to be noted that while preparing the FMEA list, values stored in connection with the components of the system organization trade-off means 6 as well as in the parts data base 31, 32 may be questioned and cited.

By virtue of the use of the failure mode and effect analysis list preparation means 7 which comprises the two types of programs (a) and (b) as stated above, the preparation of the FMEA list based on the FMEA procedure may well be done by way of interactive processing between the data diagnosis unit 4 and a specialist.

The diagnosis rule preparation means 9 is a software means specifically designed to prepare a test data diagnosis reference rule (diagnosis rule) to be described later from the contents of the FMEA list prepared by the failure mode and effect analysis sheet preparation means 7. This diagnosis rule is an aggregate of rules which are stored in the knowledge data base section 14 of the diagnosis means 10 and is described below.

As an explanation of the processing operation of this diagnosis rule preparation means 9, a concrete example is given below of a processing procedure for preparing a diagnosis rule to be used for the diagnosis of test data on a gas jet apparatus (gas jet subsystem) from the contents of the FMEA list on this gas jet apparatus, which is adapted to control the orbit and attitude of an artificial satellite by using the above-mentioned diagnosis rule preparation means 9.

FIG. 8 shows an example of an FMEA list prepared in connection with the gas jet apparatus noted above. In this list, the details in the failure mode column 54 correspond to the assumption part of the diagnosis rule to be described in the following, while the details in the cause of failure mode column 55, the failure mode effect column 56 and the recommended countermeasures column 60 may likewise correspond to the conclusion part of the diagnosis rule. For instance, if there is a statement "liquid or gas leak" 62 in the failure mode column 54 included in the superior column for the radial thruster 61, the following rule of diagnosis may be adopted.

In the diagnosis rule:

(Assumption Part): If there is a liquid or gas leak,
(Conclusion Part): Cause is an improper seal or clogging with dust, which would lead to an incapacitated attitude/orbit control. As countermeasures, it is necessary to use a duplex sealing structure, and to conduct leakage tests before and after an environmental test.

As will be appreciated from this concrete example of a diagnosis rule, it is notable that the assumption and conclusion parts of the rule correspond to the contents of the columns in the FMEA list, and so the content of these assumption and conclusion parts may be determined according to that correspondence, whereby the diagnosis rule may be presented automatically.

Figure 9:
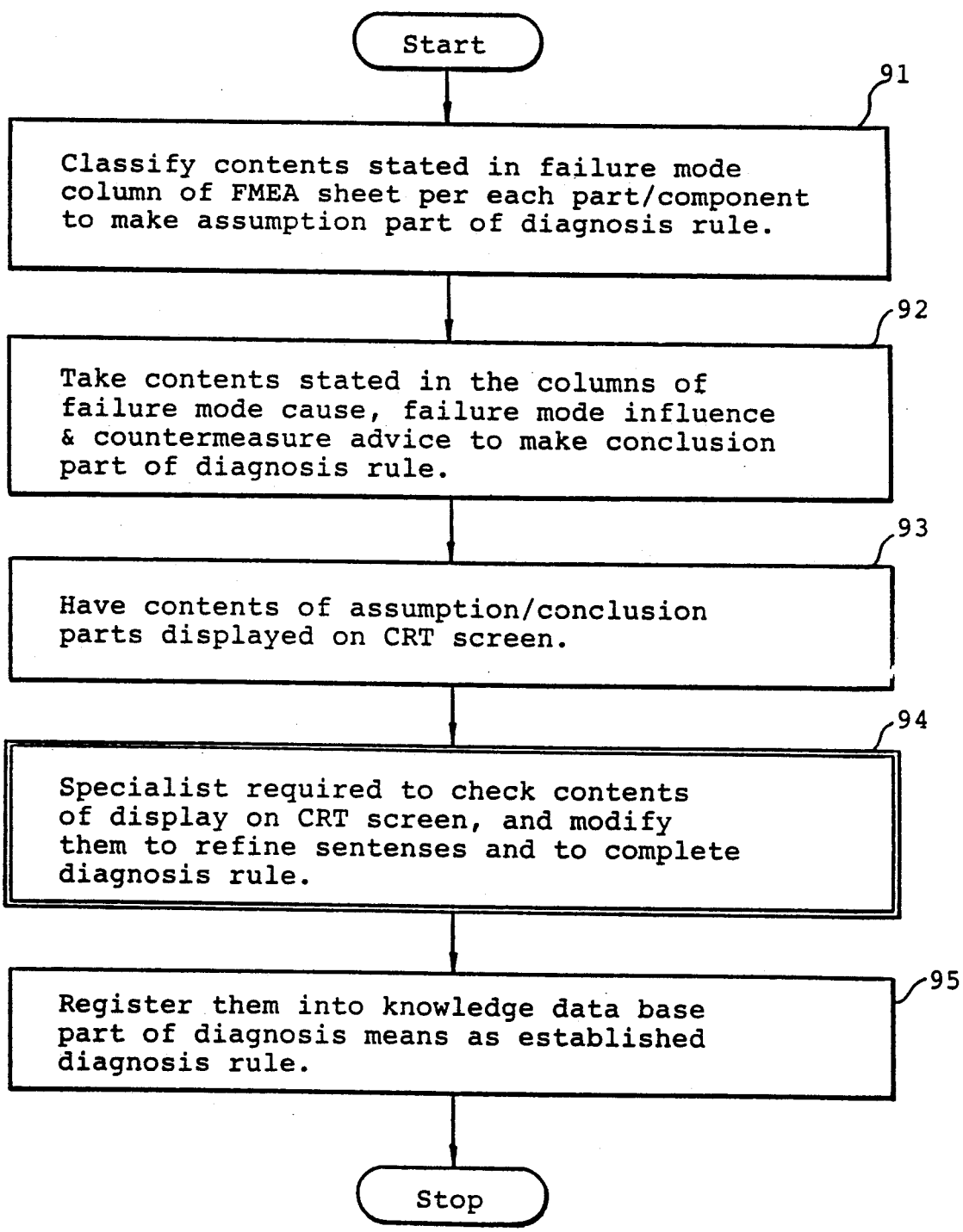
FIG. 9 is a chart explaining the operation of the diagnosis rule preparation means referred to in FIG. 8.

FIG. 9 is a flow chart showing a flow of processing as a way of explaining the operation of the diagnosis rule preparation means 9 noted above. While the steps of processing 91, 92, 93 and 95 in this chart may be performed automatically by the above-mentioned diagnosis rule preparation means 9, the processing step 94 includes a procedure whereby the content of the diagnosis rule presented automatically in the processes 91 through 93 noted above is subjected to a check conducted by human staff, and then, if it is necessary, it may be corrected by a specialist. The diagnosis rule which has been checked by the staff and corrected as necessary is registered in the knowledge data base section so that it may be efficiently put to use in the process of diagnosis.

As clarified with the foregoing explanation, the design data accumulated at the system design stage may efficiently be made available by the coordinated use of the failure mode and effect analysis list preparation means 7 and the diagnosis rule preparation means 9.

Now, the design review means 8, which comprises software incorporated in the data diagnosis unit 4 as a useful means for re-evaluation of the original system design, will be explained.

The design review means 8 comprises, as typically shown in FIG. 2, the learning section 11, the knowledge base section 12 and the inference section 13, and this design review means has the following three types of function (a), (b) and (c), which will now be explained more specifically.

(a) Design Knowledge Acquisition and Learning Function

As shown schematically in FIG. 2, this function is adapted to extract design knowledge from the results of processing (16) conducted by the system organization trade-off means 6 and the failure mode and effect analysis list preparation means 7 noted above to rearrange and reorganize this design knowledge and to generate knowledge for the reviewing of designs. This data is accumulated as a suitable knowledge base.

(b) Design Evaluation Function

This function is adapted to re-evaluate the entire system design using the knowledge for design review accumulated in the knowledge base to point out any deficiency in a design, and to have such design deficiency reflected in the design work to follow (17) by the use of the system organization trade-off means 6 and the failure mode and effect analysis list preparation means 7 noted above. Thus evaluation, improvement and affirmation of the system design is accordingly conducted.

(c) Design Consultation Function

This function is adapted to intelligently retrieve data from the knowledge base in response to an inquiry from a designer wishing to access a variety of information suitable for a system design.

These three functions (a), (b) and (c) can be exhibited through the useful cooperation that takes place between the leaning section 11, the knowledge base section 12 and the inference section 13, which together comprise the design review means 8. Each of these functional sections will now be explained more specifically.

(a) Learning Section

This learning section serves to manage the acquisition of design knowledge and the effect of learning, thus providing for intelligent processing that utilizes in a coordinated fashion the knowledge base section and the inference section.

The term "intelligent" as used herein is directed to mean "the provision of an ability to make certain inferences on the basis of the knowledge base and the inference function". The term "certain inference" is used herein to mean a generally defined concept of inference in the knowledge engineering field, such as a deductive inference, inductive inference, analogy or similarity inference, and the like.

In this respect, the learning section can automatically generate the knowledge necessary for design reviews by heuristically learning from the system design knowledge acquired by the use of the inference function and the knowledge base.

The term "heuristic learning" as used herein is directed to mean an inductive inference of the type noted above. The knowledge acquired piece by piece may not only be accumulated in the knowledge base through the steps of classification, rearrangement and systematization and/or structural organization, but may also serve to mutually supplement any deficiency in the knowledge base.

(b) Knowledge Base Section

It is the knowledge base section which classifies, reorganizes and edits a variety of items of knowledge to be stored and accumulated therein.

The term "knowledge" as used herein is directed to cover the following four types knowledge as defined below.

(i) Past Design Information

Data and information on designs, system failures, and check lists as represented in terms of characters, numerical values, graphics, images and the like as obtained in connection with previous designs.

(ii) Newly Acquired Design Information

Data and information acquired newly from the results of processing performed by the system organization trade-off means 6 and the failure mode and effect analysis list preparation means 7 as noted above.

(iii) Information Acquired by Learning

Knowledge available for the purpose of design reviews as obtained from the results of learning from the design information acquired in accordance with paragraph (ii) above.

(iv) Information on Design Models

This is directed to information representing the object of a design per se, which is also called "an object model" in the field of knowledge engineering, as exemplified by one which represents subject matter designed on the basis of a given essential design specification.

As listed up above, such four types of knowledge may be accumulated in a variety of fashions in the knowledge base section 12.

The wording "a variety of fashions" follows the knowledge notation commonly used in the field of knowledge engineering, which is generally used to mean "production system", "frame", "blackboard model", "semantic network", "predicate calculus", "object", etc.

(c) Inference Section

The inference section 13 comprises an individual mechanism which is independent from the learning section 11 and from the knowledge base section 12, and this inference section may perform an inferential operation by making use of the knowledge accumulated in the knowledge base section 12.

The term "inference" as used herein is directed to mean the concept of "function to derive information from given information where said derived information has the same or an implied meaning of said given information but has a different expression in at least an explicit fashion", and hence, the commonly adapted syllogism may be covered by this concept of inference.

However, this inference section 13 may, as noted above, cover such varied inference functions as those defined generally as inductive inferences, analogy inferences, default inferences, and the like.

As will be fully appreciated from the foregoing explanation, the design review means 8 which comprises the learning section 11, the knowledge base section 12 and the inference section 13 may be furnished extensively with a design knowledge acquisition and learning function, and a design review function, as well as a design consultation function. Thus it can be adapted efficiently as a useful design assistance means for the re-evaluation of designs and other purposes.

Next, the diagnosis means 10 will be explained which is similar form of software incorporated as an operable means in the data diagnosis unit 4 noted above, and which is adapted to perform diagnosis of test data at the time of testing.

This diagnosis means 10 is a software means or program which is commonly called a "diagnostic type expert system" in the field of knowledge engineering or artificial intelligence. It comprises a knowledge data base 14 and an inference function section 15, and is adapted to operate within the data diagnosis unit 4 noted above to diagnostically process test data.

The knowledge data base 14 has a set of decision standards for the diagnosis of test data organized in the form of rules or regulations which form a data base serving as an aggregate of rules. An example of such diagnostic rules for test data is shown in FIG. 10, which will be explained below.

In FIG. 10, five rules of diagnosis are shown schematically with the reference numerals 101 through 105 appended thereto. Each rule consists of an assumption part 106 and a conclusion part 107, wherein the assumption part 106 corresponds to a subordinate clause such as "if . . . ", and the conclusion part 107 corresponds to a clause such as "then . . . ". For example, referring more specifically to this chart, what is represented by the rule 5 (105) is "If the attitude detecting sensor No. 1 is normal and if the gyroscope No. 1 is normal and if wheel No. 1 is out of order, there is a possibility that the attitude and orbit subsystem 1 will be out of order in relation to its wheel. As a countermeasure, check the driver circuit of the wheel and the level of the input signal."

The knowledge data base 14 contains an aggregate of rules of this sort as explained by way of example above.

Next, the inference function section 15 is constructed with a general algorithm which is generally called the "inference engine" in the field of knowledge engineering and artificial intelligence. More specifically, it is provided in the form of software that, for example, allows an inference to be made from a result by way of a so-called syllogism or the like, and is operable when making an inference with the results of diagnosis from the aggregate of the "if . . . , then . . . " rules.

With the use of the knowledge data base 14 and the inference function section 15 as noted above, diagnosis is performed on the test data to determine from such data whether the condition is normal or abnormal and, if it is abnormal, to make a suitable prediction as to the improper part of the system from the data indicating what is abnormal and to select automatically a suitable countermeasure which is displayed for the operator.

Having explained the construction and operation/effect of each of the software means incorporated in the data diagnosis unit 4, a summary will now be given of the relationship between and the general posture of each of these means in terms of operation and effect, which is illustrated by way of the flow chart in FIG. 11.

Figure 11:
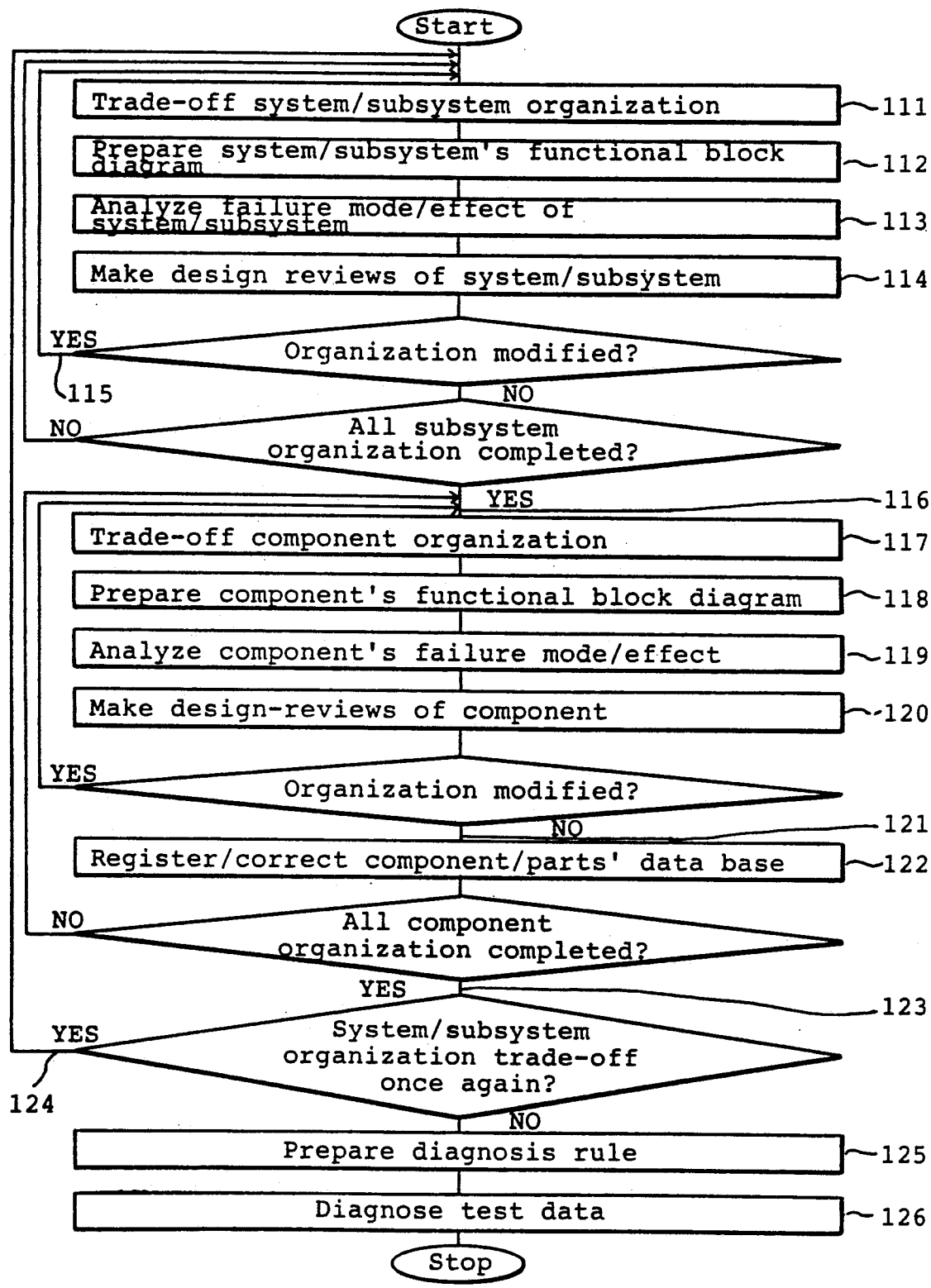
FIG. 11 is a flow chart explaining a series of processing operations of a plurality of means incorporated in the data diagnosis unit.
Figure 12:
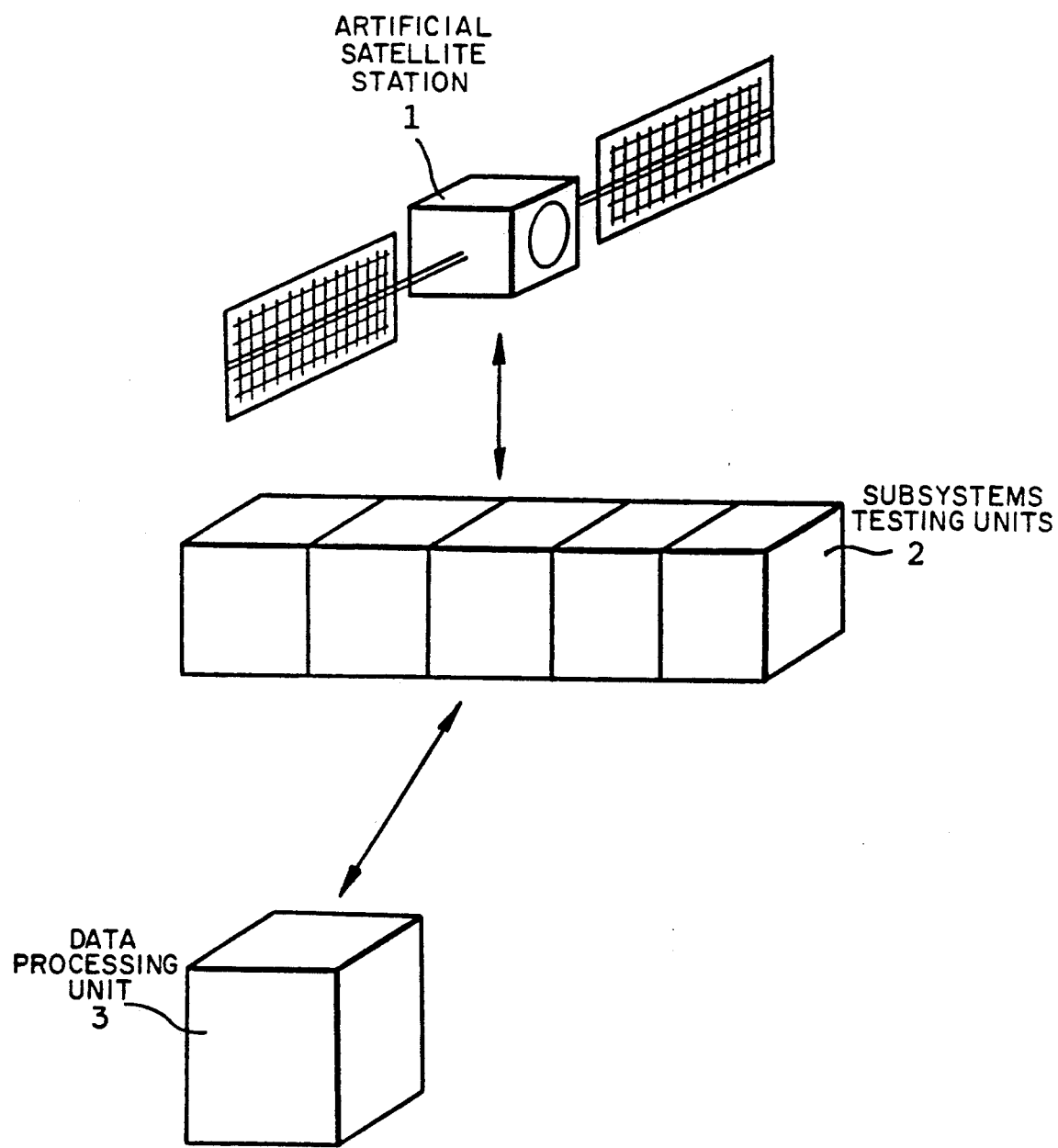
FIG. 12 is a similar schematic view showing the general construction of a conventional artificial satellite test apparatus.

Referring to FIG. 11, a trade-off processing (111) is first performed on the system/subsystem organization by the system organization trade-off means 6, following which a process of preparing the system/subsystem functional block diagram (112) is performed. Based on this functional block diagram, a system/subsystem failure mode and effect analysis processing (113) is performed by the failure mode and effect analysis list preparation means 7, which allows an FMEA list to be prepared.

Next, a design review processing (114) is performed for the re-evaluation of the design work by the design review means 8. In case it is necessary to modify or correct the system/subsystem construction (115) as a result of the design review, the procedure returns to the trade-off processing (111) noted above for a similar processing. However, it is to be noted that the design review processing (114) above may alternatively be performed, if desired, after such stages as the above-mentioned trade-off processing (111) or the functional block diagram preparation processing (112).

In a similar manner, when the organization of all the subsystems involved in the entire system is accomplished (116), the procedure then shifts to the trade-off processing of the component organization (117).

Then, a functional block diagram for the components of the system may likewise be prepared (118) as in the system/subsystem organization trade-off processing (111) noted above, and then an FMEA list is prepared according to the results of the failure mode and effect analysis processing (119) conducted on the components. Thereafter, the design review processing (120) conducted on the involved components is performed in a similar manner. This step of design review processing (120) may alternatively be done, if required, after the above-mentioned component organization trade-off processing (117) or the preparation of the component functional block diagram (118).

In case there is no need to modify the construction of components involved in the system (121), the component data and the parts data as prepared in the processings noted above will then be registered in the component data base and the parts data base, respectively, which are then subjected to a step of modification processing (122). Then if the organization of all the components involved in the system has been prepared in a similar manner (123), the flow proceeds to the following processing.

In case some influence upon the system/subsystem organization noted above occurs due to changes in the construction of certain components involved (124), it would then be necessary to perform a trade-off processing on the system/subsystem organization once again, so the procedure returns to the first step of processing (111).

With such processing operations, when all the processing steps for the organization of the system/subsystem and components have been completed, and when the preparation of all FMEA list has been finished, the flow now proceeds to a diagnosis rule preparing processing (125) to be performed by the diagnosis rule preparation means 9. A diagnosis rule for the diagnosis of test data may thus be established, which is registered as the established diagnosis rule in the knowledge data base 14 of the diagnosis means 10.

When all these processing operations have been accomplished, a step of test data diagnosis processing (126) may be performed by the diagnosis means 10 upon the actually manufactured artificial satellite station as an object system to be tested. This completes the full series of processing operations.

Although the present invention has been described by reference to a preferred embodiment thereof represented by a test apparatus for an artificial satellite station, the invention may of course be adapted to aircraft, or other vessels or vehicles, and also to any testing apparatus which requires that systematic diagnostic operations be performed.

Although the present invention has been described by reference to a preferred embodiment thereof in which a diagnosis rule stored in knowledge data base 14 of diagnosis means 10 is a form of "if A then B", the form of such diagnosis rule is not limited to this and may consist of such forms as a frame, blackboard model, semantic network, predicate calculus, object or combination thereof. Similarly, the inference function section 15 of diagnosis means 10 mentioned before need not necessarily be a syllogism but may also consist of inference functions such as inductive inferences, analogy inferences or default inferences as generally defined in the field of knowledge engineering.

Further, the result of the diagnosis means 10 may be utilized for generating knowledge for the reviewing of designs by inputting them to the design review means 8 like the result of the system organization trade-off means 6 and that 16 of the failure mode and effect analysis list preparation means 7.

Although all the means 5 through 10 described with reference to the above preferred embodiment consist of software, they may alternatively consist of hardware, firmware or a combination thereof if the same function and capability can thus be obtained. Examples of suitable hardware and firmware are a neuro chip which is a neural network made into a semiconductor chip and a fuzzy chip for processing the fuzzy set theory, and the means 5 through 10 may consist of a combination of such hardware and firmware.

Finally, even though an inference machine is used in the preferred embodiment as a data diagnosis unit 4, if the processing done by the means 6 through 10 can be satisfactorily performed, any kind of computer (machine) can be used and any number of computers can be used (i.e. a distributed system may be used in accordance with the matter to be processed by the means 6 through 10). Alternatively, just one computer may be used by providing the data processing unit 3 and data diagnosis unit 4 as a single unit.

It is to be understood that the appended claims are intended to cover all of such generic and specific features as are particular to the invention disclosed herein and all statements relating to the scope of the invention, which as a matter of language might be said to fall thereunder.

What is claimed is:

1. A test apparatus having a data processing means for processing test data received from a system to be tested, comprising:

an organization trade-off means for determining the organization of said system in response to interactive requests and in accordance with a specification of said system and for preparing a functional block diagram of said system;

a failure mode and effect analysis list preparation means responsive to said origanization trade-off means for performing a failure mode and effect analysis on said functional block diagram prepared by said organization trade-off means and for preparing a failure mode and effect analysis list in accordance with the results of said failure mode and effect analysis;

a design review means coupled to said organization trade-off means and said failure mode and effect analysis list preparation means, comprising a learning means for acquiring and learning design knowledge from the results of said organization trade-off means and said failure mode and effect analysis list preparation means, a knowledge base means coupled to said learning means for accumulating the knowledge and design knowledge generated by said learning means, and an inference means coupled to said knowledge base means and said learning means for performing inferences using the knowledge accumulated in said knowledge base means;

a diagnosis rule preparation means responsive to said failure mode and effect analysis list preparation means for preparing a diagnosis rule for determining test data diagnosis from said failure mode and effect analysis list preparation means; and a diagnosis means responsive to said diagnosis rule preparation means and said data processing means comprising a knowledge data base for registering said diagnosis rule for determining test data diagnosis prepard by said diagnosis rule preparation means and for constructing a data base as an aggregate of diagnosis rules, and an inference function means coupled to said knowledge data base for inferring a result of diagnosis of said test data received from said data processing means by using said aggregate of diagnosis rule in said knowledge data base.

2. A test apparatus as set forth in claim 1 wherein said system comprises a plurality of components, each of said components further comprises a plurality of parts, and wherein said organization trade-off means comprises:

a component data base for storing data and evaluation parameters for each of said plurality of components;

a part data base for storing data and evaluation parameters for each of said plurality of parts;

an interactive processing means coupled to said component data base and said part data base for determining the organization of a system in reponse to interactive request by selecting component data from said component data base, and for determining the organization of the components in response to interactive requests by selecting part data from said part data base;

a functional block diagram preparation means coupled to said interactive processing means for preparing and displaying said functional block diagram in the form of a design drawing based on the organization of said parts, said components and said system as determined by said interactive processing means.

3. A test apparatus as set forth in claim 2, wherein said interactive processing means determines the organization of said system by selecting component data and associated evaluation parameters.

4. A test apparatus as set forth in claim 3, including means for displaying both the component data and associated evaluation parameters.

5. A test apparatus as set forth in claim 4, wherein said system comprises a subsystem.

6. A test apparatus having a data processing means for processing test data received from a system to be tested, comprising:

an organization trade-off means for determining the organization of said system in response to interactive requests and in accordance with a specification of said system and for perparing a functional description of said system;

a failure mode and effect analysis list preparation means responsive to said organization trade-off means for performing a failure mode and effect analysis on said functional description prepared by said organization trade-off means and for preparing a failure mode and effect analysis list in accordance with the results of said failure mode and effect analysis;

a design review means coupled to said organization trade-off means and said failure mode and effect analysis list preparation means for reviewing the result of said trade-off procedure and the results of the failure mode and effect analysis;

a data diagnosis rule preparation means responsive to said failure mode and effect analysis sheet preparation means for preparing a diagnosis rule for determining test data diagnosis from said failure mode and effect analysis list prepared by said failure mode and effect analysis list preparation means;

and a diagnosis means responsive to said diagnosis rule preparation means and said data processing means for diagnosing test data in accordance the diagnosis rules prepared by said diagnosis rule preparation means.

7. A test apparatus as set forth in claim 6 wherein said design review means further comprises:

learning means responsive to said organization trade-off means and said failure mode and effect analysis list preparation means for acquiring and learning design knowledge in response to interactive requests and from the results of said organization trade-off means and said failure mode and effect analysis list preparation means, knowledge base means coupled to said learning means for accumulating the knowledge and design knowledge generated by said learning means, and inference means coupled to said knowledge base means and said learning means for performing inferences using the knowledge accumulated in said knowledge base means.

8. A test apparatus as set forth in claim 7 wherein said learning means of said design review means comprises:

means, responsive to said inference means and said knowledge base means, for managing acquisition of design knowledge and intelligently processing such design knowledge through classification, systemization and structural organization.

9. A test apparatus as set forth in claim 8 wherein said learning means further comprises:

means, responsive to said inference means and said knowledge base means, for making inductive inferences, deductive inferences and analogies, given an inference function and said knowledge accumulated in said knowledge base means.

10. A test apparatus as set forth in claim 7 wherein said inference means of said design review means comprises:

means, responsive to said learning means and said knowledge base means, for deriving information from said knowledge in said knowledge base means, said derived information having a similar meaning but a different explicit expression.

11. A test apparatus as set forth in claim 7 wherein said knowledge base means of said design review means comprises:

means, responsive to said learning means and said inference means, for classifying, reorganizing and editing said knowledge stored within said knowledge base means.

12. A test apparatus as set forth in claim 11 wherein said knowledge contained in said knowledge base means comprises past design information, newly acquired design information, information acquired by learning, and information on design models.

13. A test apparatus having a data processing means for processing test data received from a system to be tested, comprising:

an organization trade-off means for determining the organization of said system in response to interactive requests and in accordance with a specification of said system and for perparing a functional block diagram of said system;

a failure mode and effect analysis list preparation means responsive to said organization trade-off means for performing a failure mode and effect analysis in accordance with said functional block diagram and for preparing a failure mode and effect analysis list in accordance with said failure mode and effect analysis;

a design review means coupled to said organization trade-off means and said failure mode and effect analysis list preparation means comprising:

knowledge acquisition and learning means coupled to said organization trade-off means and said failure mode and effect analysis sheet preparation means for extracting design knowledge from said system organization trade-off means and failure mode and effect analysis list preparation means and for rearranging and reorganizing said design knowledge, design evaluation means coupled to said knowledge acquisition and learning means for re-evaluating a system design using design knowledge, design consultation means coupled to said design evaluation means and said knowledge acquisition and learning means for intelligently retrieving said design knowledge in response to interactive requests;

a diagnosis rule preparation means responsive to said failure mode and effect analysis list preparation means for perparing a diagnosis rule determining a test data diagnosis from said failure mode and effect analysis list preparation means; and a diagnosis means responsive to said diagnosis rule preparation means and said data processing means comprising a knowledge data base means for registering said diagnosis rule for determining a test data diagnosis prepared by said diagnosis rule preparation means and constructing a data base as an aggregate of diagnosis rules, and an inference function means coupled to said knowledge data base means for inferring a result of diagnosis of said test data from said data processing means by using said aggregate of diagnosis rules in said knowledge data base means.

14. A test apparatus as set forth in claim 13 wherein said design review means further comprises:

a learning means responsive to said organization trade-off means said failure mode and effect analysis list preparation means for acquiring and learning design knowledge from said organization trade-off means and said failure mode and effect analysis list preparation means, a knowledge base means coupled to said learning means for accumlating the knowledge and design knowledge generated by said learning means, and an inference means coupled to said learing means and said knowledge base means for performing inferences using the knowledge accumulated in said knowledge base means.

* * * * *